United States Patent
Gray (10) Patent No.: US 11,228,680 B2
(45) Date of Patent: Jan. 18, 2022

(54) CALLING PARTY VALIDATION

(71) Applicant: BRITISH TELECOMMUNICATIONS PUBLIC LIMITED COMPANY, London (GB)

(72) Inventor: Paul Gray, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/733,620

(22) PCT Filed: Feb. 27, 2019

(86) PCT No.: PCT/EP2019/054825
§ 371 (c)(1),
(2) Date: Sep. 17, 2020

(87) PCT Pub. No.: WO2019/179728
PCT Pub. Date: Sep. 26, 2019

(65) Prior Publication Data
US 2021/0044696 A1 Feb. 11, 2021

(30) Foreign Application Priority Data
Mar. 21, 2018 (EP) .................................. 18163174

(51) Int. Cl.
*H04M 3/436* (2006.01)
*H04M 3/22* (2006.01)
*H04M 3/42* (2006.01)

(52) U.S. Cl.
CPC ......... *H04M 3/436* (2013.01); *H04M 3/2281* (2013.01); *H04M 3/42042* (2013.01)

(58) Field of Classification Search
CPC . H04M 3/436; H04M 3/2281; H04M 3/42042
(Continued)

(56) References Cited

U.S. PATENT DOCUMENTS 7,113,577 B2 * 9/2006 Cook .................... H04M 1/576
379/142.01
7,295,660 B1 * 11/2007 Higginbotham ...... H04M 3/436
379/196

(Continued)

FOREIGN PATENT DOCUMENTS

| EP | 2978201 | 1/2016 |
| GB | 2524302 | 9/2015 |
| WO | WO2011/025688 | 3/2011 |

OTHER PUBLICATIONS

European Search Report, Application No. 18163174.8, dated Sep. 3, 2018, 8 pages.

(Continued)

*Primary Examiner* — Binh Kien Tieu
(74) *Attorney, Agent, or Firm* — Patterson Thuente Pedersen, P.A.

(57) ABSTRACT

In order to confirm that a telephone call received by a network termination on a first connection is from a trusted party, the called party connects over a second, independent, connection 7 to a server associated with the trusted party and shares a code with the server. That code is then transmitted over the first connection and, if the connection is genuine, it is intercepted by the server which generates a message over the second connection confirming that the code has been matched. This gives the called party assurance that the call is from a party associated with the trusted server. If a rogue caller attempts to call the termination, the called party's transmission of the shared code will be routed over the caller's connection, which is not associated with the trusted server, so no match will be identified by the server and no confirmation is returned over the second connection.

15 Claims, 6 Drawing Sheets

(58) Field of Classification Search
USPC .................................................. 379/207.15
See application file for complete search history.

(56) References Cited

U.S. PATENT DOCUMENTS

| | | | | |
|---|---|---|---|---|
| 8,027,441 | B2* | 9/2011 | Cahill | H04M 15/00 379/130 |
| 10,750,019 | B1* | 8/2020 | Petrovykh | H04L 51/02 |
| 2009/0025075 | A1 | 1/2009 | Chow | |
| 2009/0046839 | A1* | 2/2009 | Chow | H04L 63/0823 379/142.01 |
| 2009/0262914 | A1* | 10/2009 | Khouri | H04M 3/42068 379/202.01 |
| 2011/0091026 | A1* | 4/2011 | van Oortmarssen | H04M 3/38 379/142.01 |
| 2012/0040644 | A1* | 2/2012 | Naik | H04N 1/00307 455/412.1 |
| 2013/0013921 | A1* | 1/2013 | Bhathena | H04L 63/0471 713/168 |
| 2014/0230069 | A1* | 8/2014 | Milman | H04L 63/0407 726/26 |
| 2020/0099677 | A1* | 3/2020 | Grajek | H04W 12/069 |
| 2020/0234563 | A1* | 7/2020 | Martin | H04M 11/04 |
| 2021/0067343 | A1* | 3/2021 | Abad | H04L 9/3247 |

OTHER PUBLICATIONS

Exam Report Under Section 18(3) for GB1804525.2 dated May 7, 2020, 3 pages.
International Search Report and Written Opinion, Application No. PCT/EP2019/054825, dated Mar. 29, 2019, 8 pages.

\* cited by examiner

CALLING PARTY VALIDATION

PRIORITY CLAIM

The present application is a National Phase entry of PCT Application No. PCT/EP2019/054825, filed Feb. 27, 2019, which claims priority from EP Patent Application No. 18163174.8, filed Mar. 21, 2018, each of which is hereby fully incorporated herein by reference.

TECHNICAL FIELD

This disclosure relates to voice call authentication and, in particular, to validating a calling party on behalf of a called party. For example, the calling party may be an organization, such as a commercial organization, and the called party may be a customer or potential customer of the organization.

BACKGROUND

Many voice-call terminals display, during an incoming call, an indication of the identity of the calling party, for example, the calling party's phone number. However, it is possible in some circumstances for the calling party to withhold or spoof the calling party number displayed so that the called party is unable to verify the source of the call.

It is known, for example, from WO2011/025688 (Bank of America) to provide a method for allowing a called party to identify a call purporting to come from a trusted calling party as being genuine by incorporating, in the data sent in the call, a verification code or other data previously agreed between the trusted party and the called party. However, this system would not prevent "spoofing" attempts by rogue callers if previous communications between the parties had been intercepted, as the shared secret would be apparent from the intercepted call.

SUMMARY

According to the disclosure, there is provided a method for authenticating a call from a call originator to a call recipient, in which the method comprises, at a server: monitoring a first communications path assigned to a first party; monitoring a call originated by the first party over the first communications path to detect a first code entered on the call by the call recipient; comparing the first code detected in the call with a second code shared between the call recipient and the server on a second communications path independent of the first communications path; and where the first code detected in the call matches the second code shared between the call recipient and the server, providing to the call recipient, over the second communications path, an indication that the call originator on the call is the first party.

As the exchange of codes is carried over two separate communications paths, each set up by a different party, both parties can be assured of the other party's authenticity. Moreover, as a different code can be generated for each session, previous attempts to compromise communications between the parties will not reveal the code used on a call currently in progress. In this way, the person receiving a call may be reassured that they are speaking with a representative of the organization that the caller claims to represent, for example before disclosing confidential information.

The server has access to outbound calls from an organization to the customer and provides an interface to the customer that allows the customer to communicate with the server by sharing a code and to verify the identity of the organization that has called them. This solution protects customers from fraudulent calls. By allowing a customer to communicate with a server monitoring outbound calls from an organization, the invention allows the customer to quickly and simply validate that an incoming call represents a genuine connection to the organization purported to be the source of the call The code may be shared between the call recipient and the server by:
 receiving at the server over the second communications path, a request communicated by a call recipient; and
 in response to the request, providing the code to the call recipient over the second communications path.

Alternatively, the code may be shared between the call recipient and the server by:
 receiving the code at the server from the call recipient over the communications path.

In an embodiment, the indication is only provided if detection of the first code in the telephone call occurs within a set time period after sharing the second code between the call recipient and the server.

The first communications path may comprise one of a PSTN, an ISDN and a SIP/VoIP circuit or trunk.

The indication provided to the call recipient over the second communications path may include an indication of an identity of the first communications path.

The server may be responsive to receiving a third code from the call originator corresponding to the second, shared, code to set up a secure connection over the second communications path.

The disclosure also extends to a computer program element comprising computer program code to, when loaded into a computer system and executed thereon, cause the computer to perform the method of the disclosure.

The disclosure also extends to a server configured to operate according to the method of the invention.

DETAILED DESCRIPTION

In the Figures, dashed lines indicate audio channels, carrying voice and DTMF signals, solid lines indicate data channels, and dotted lines indicate interactions over the human interface between the user 13 and the terminals 12, 14.

Figure 1:
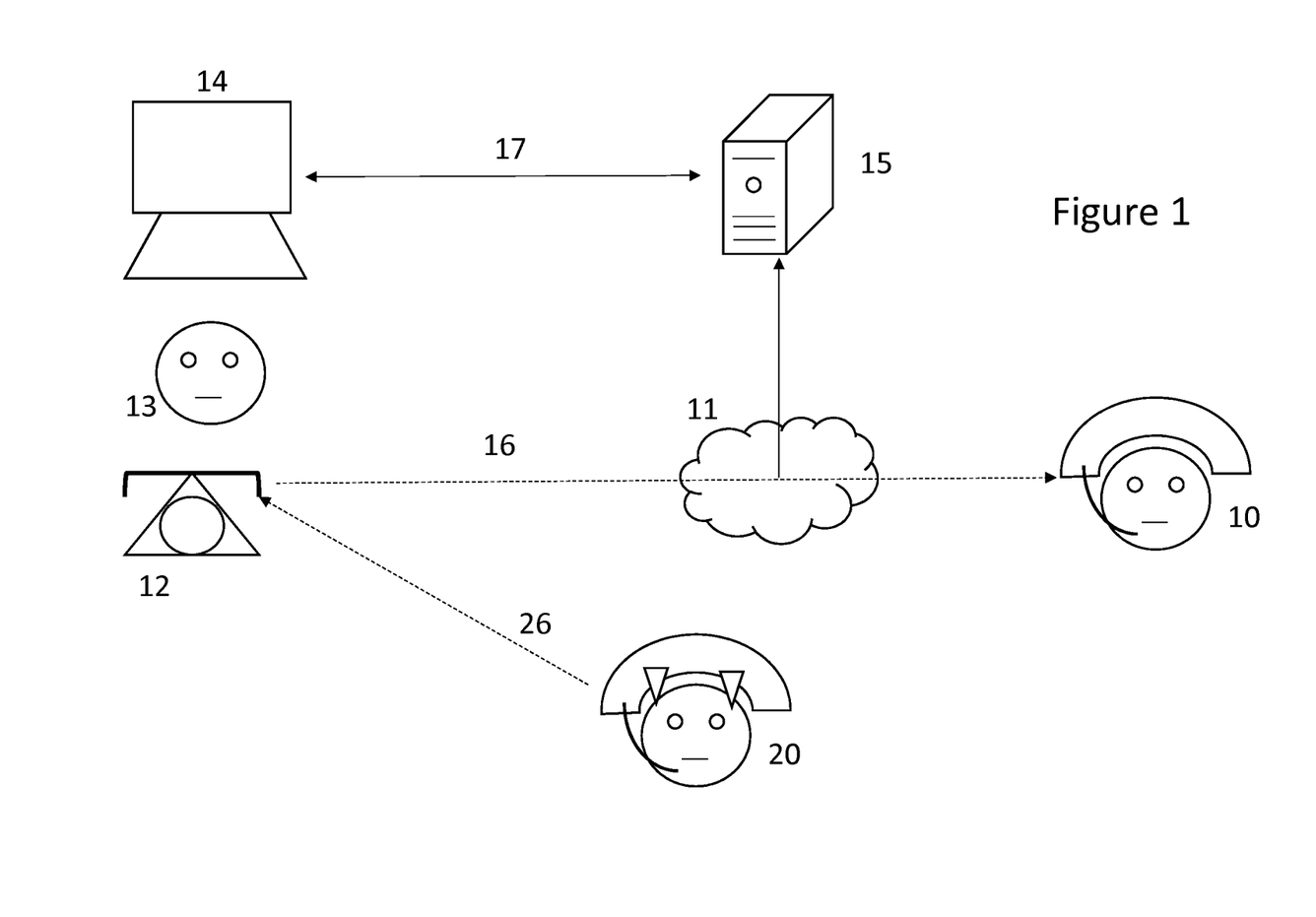
FIG. 1 shows a schematic representation of a network according to an embodiment of the disclosure.

FIG. 1 depicts a call center operator terminal 10 communicating through a network connection 11, such as a private branch exchange, with a first network termination 12 over a first network path 16. The network connection 11 has an associated call server 15. A called party 13 has access to both the first network termination 12 and a second user termination 14. The second user termination is capable of establishing a network connection with the call server 15 over a second network path 17, independent of the first. Typically the first network path is a voice call, and the second data path is a data call. The respective terminations 12, 14 of the network paths 16, 17 are depicted as separate devices, but both paths may terminate in the same device provided it is capable of supporting two independent sessions simultaneously, over independent paths.

The invention uses a code shared between the called party 13 and the server 15 in the course of an incoming voice call 1 to validate whether the call originates from the organization claimed by the calling party. A typical situation where the disclosure can be used is where the calling party 10 is asking the called party 13 for confidential information, for example, in response to a receipt of an incoming call from a calling party 10 claiming to represent a trusted organization.

The caller 10 and server 15 are associated with an organization such as a business.

According to an embodiment, the server 15 is connected to the organization's outgoing call paths (be they PSTN, ISDN or SIP/VoIP circuits or trunks). The server is able to read digits 4 entered on those lines by called parties, for example using DTMF tones. Each customer is provided with an app or web address through which they can request a code from the server (step 3). The app or web page is provided with the correct URL and secure login details.

Figure 2:
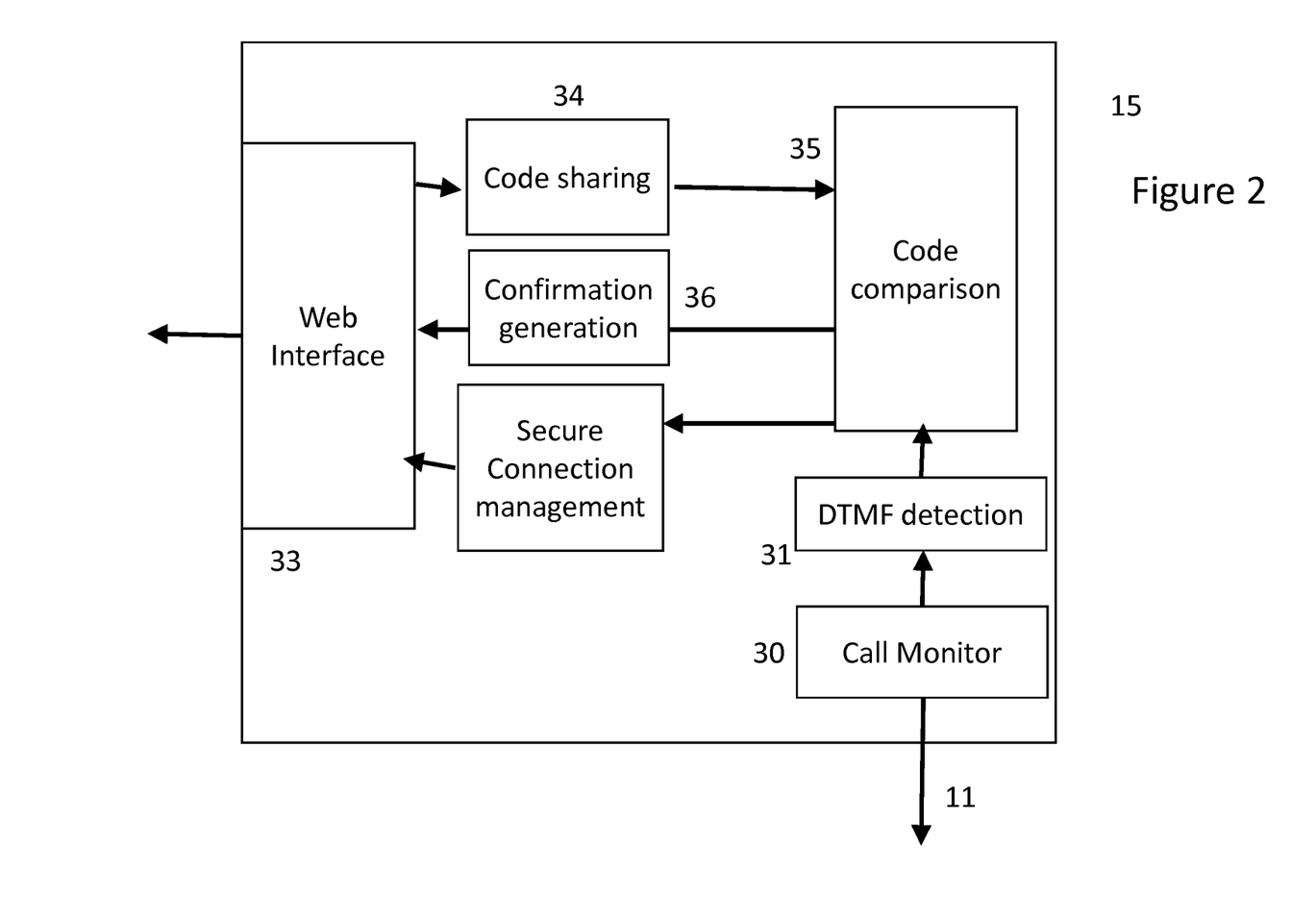
FIG. 2 depicts the functional elements of a server operating according to the disclosure.

FIG. 2 is a schematic representation of the functional elements of the server 15 relevant to the disclosure. It will be understood that these functions can be embodied in software in a general purpose computer. The server 15 comprises a call monitor 30 for monitoring call traffic on the network connection 11 (FIG. 1) and DTMF detector 31 for identifying and interpreting DTMF codes in the call traffic. A web interface 32 provides a data connection to which customers can communicate using a second network connection 17 independent of the network connection 11. A code sharing system 34 is provided which can operate to share a security code with a corresponding network terminal 14 over the connection 17. Depending on the embodiment it can either generate security codes for transmission over the web interface to the corresponding network terminal 14, or it can receive codes over the web interface generated by the network terminal 14.

A code comparator 35 is configured to compare codes generated or received by the code sharing system 34 with codes detected by the monitor 31 and produce an output. A confirmation generation processor 36 is responsive to this output to generate a confirmation message for transmission over the web interface 33 if a match is detected. In one embodiment, a secure connection management system 37 is also provided to set up a secure connection through the interface 33 over the second connection 17 in response to an output from the comparator 35.

Figure 3:
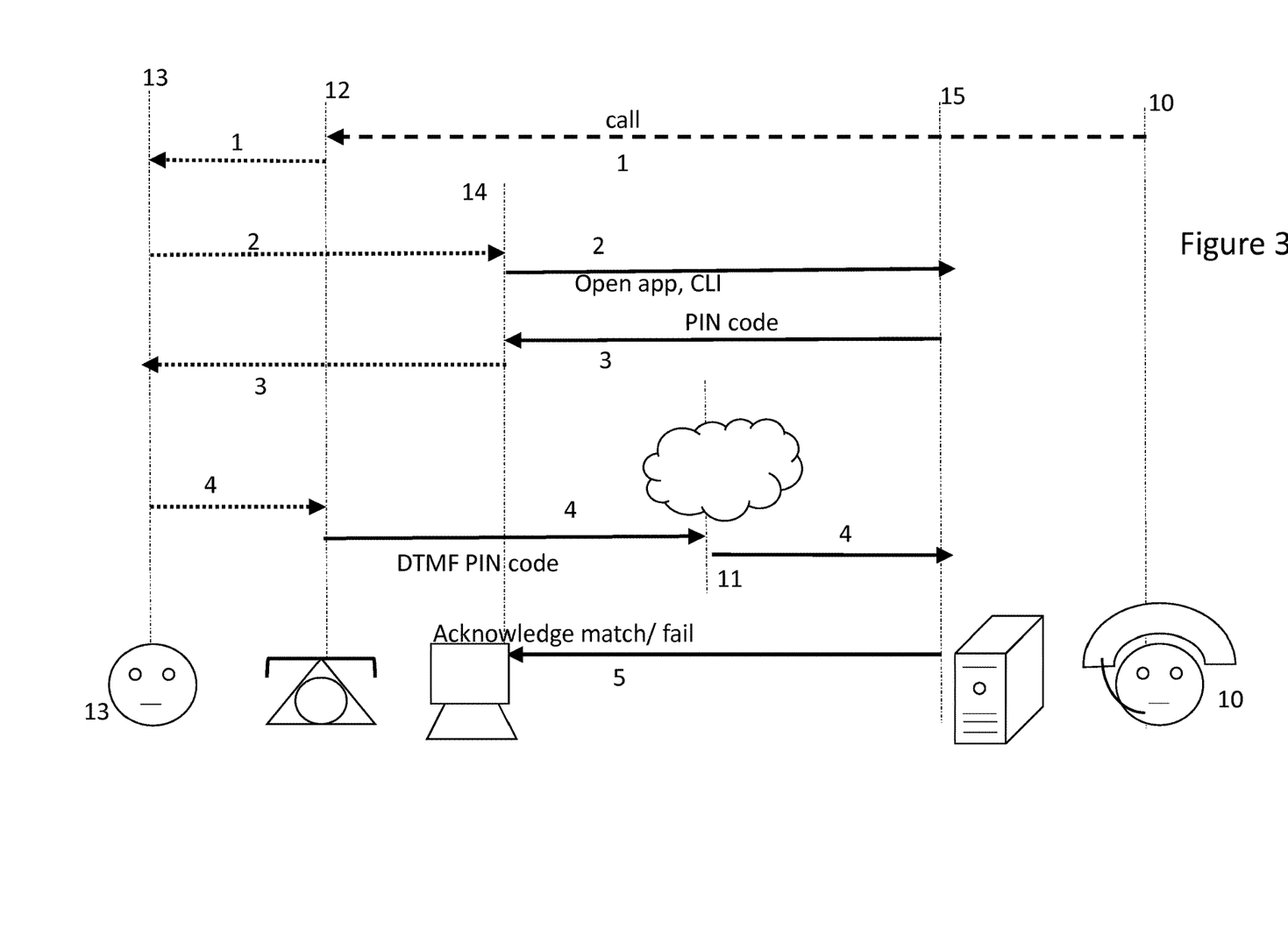
FIGS. 3, 4, 5 and 6 show operations according to embodiments of the disclosure.
Figure 4:
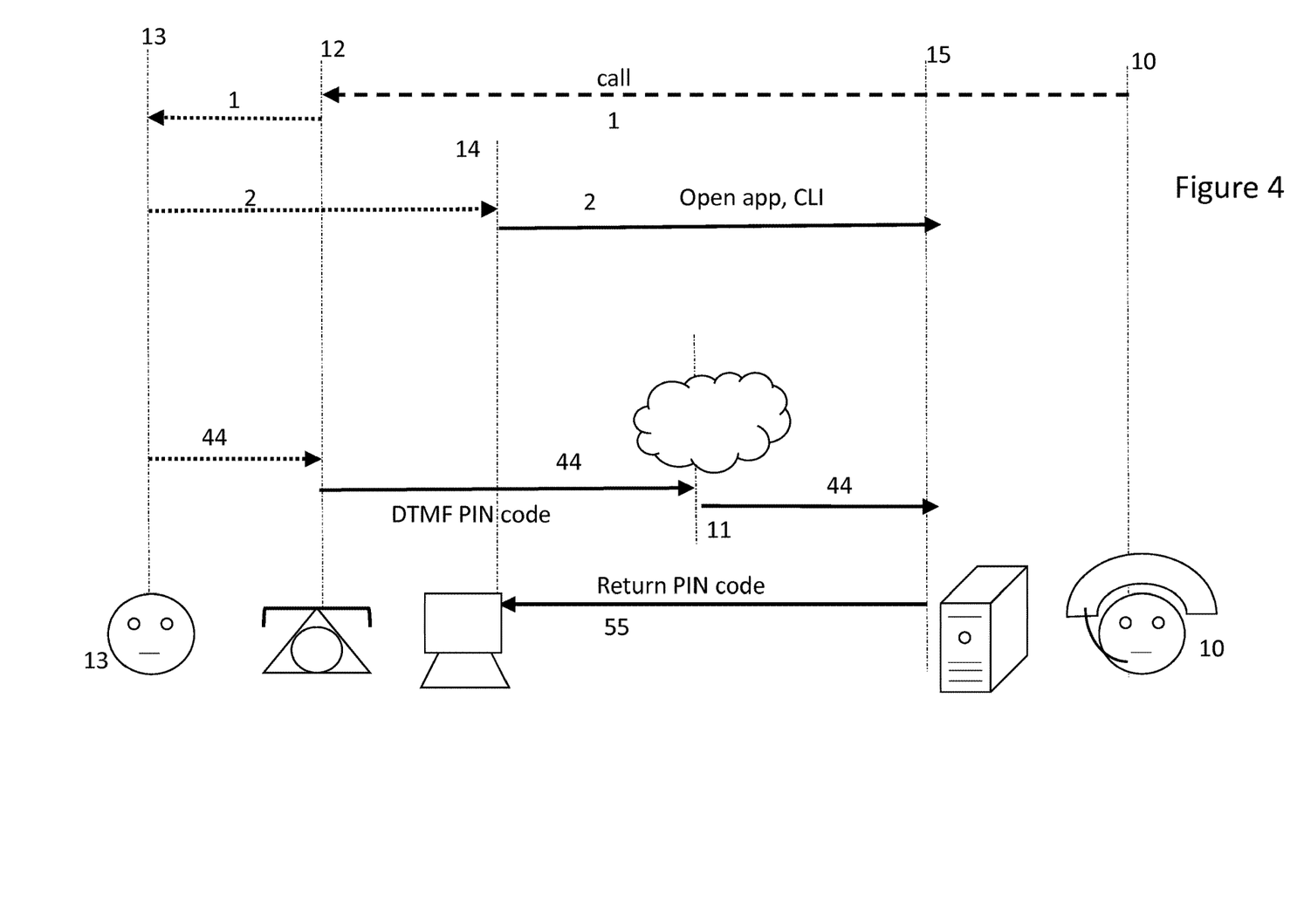

Three embodiments of the disclosure will be described with reference to FIGS. 3, 4 and 5 of the drawings, which differ in the way the codes are verified. According to a first embodiment, depicted schematically in FIG. 3, operation of an embodiment of the disclosure comprises:

i) The organization 10 makes a call to a customer 13 on a first path 16,
ii) The customer answers the call.
iii) The customer, wanting to perform a validation check, opens the organization's app or web page 2 using a termination 14 on a separate communications path 17.
iv) The customer receives a code 3 through the app or web page.
v) The customer enters the code 4 on the live call via DTMF digits.
vi) The server 15 detects the DTMF digits entered by monitoring traffic on the organization's outgoing call paths 16. The detected DTMF digits are checked by the server.

Where the detected DTMF digits correspond to a valid code (e.g. a code that has not expired and that was issued for the organization that is associated with the live call), a notification 5 (e.g. a green tick symbol) is returned to the customer through the app or web page 14 to inform the customer that the caller is genuine. The check could be done by the server, the app/webpage or elsewhere. The confirmation message may also include the calling line identity of the line 16 on which the detected DTMF digits 4 were received.

According to this embodiment, in response to a call 1 received over the first path 16 at the first termination 12, purporting to be from a caller 10 associated with a legitimate business, the customer 13 may look up a URL or IP address for a website associated with that business, or may have that IP address previously programmed into the second termination 14. The address of the server 15 or instructions for downloading the app may have been provided to the customer 13 by the organization, for example in a letter or an email confirming that the customer has entered into a commercial relationship with the organization. Alternatively, the address of the server or the app may have been located by the customer through an online search or by a recommendation on a consumer protection website. These all allow the user 13 to identify, independently of the incoming call, a means of contacting the server 15 associated with the organization the caller 10 claims to represent.

When an incoming call 1 has been received by the customer 13 at the first termination 12 over the path 16, the customer uses the url or other details (step 2) to instruct the second termination 14 to prompt the server 15 to authenticate the calling party 10. The server 15 has access to outgoing call paths 16 from the organization and is able to monitor the network connection 11 for outgoing calls, i.e. calls originated at the organization. In particular, it monitors for DTMF or similar codes 4 received at the network connection 11. When the server detects a code 4 entered by the customer on a call, the server compares the detected code with a code 3 previously shared with a customer outside of the call. If the two codes match, the server provides a positive indication 5 to the customer, i.e. an indication that the calling party is the organization.

The server may host a web session shared with the app or a web browser running on a networked device operated by the customer. According to an embodiment, the server provides a code 3 to the customer through the web session. According to a further embodiment, the customer provides a code to the server. Once the customer has received the code from the server or the customer has provided the code to the server, as the case may be, the customer then enters the same code 4 live on the call path in the course of an incoming phone call, for example, using DTMF digits. These digits are extracted by the If the server 15 detects, on one of the organization's outgoing call paths 16, a code 4 that matches a code 3 provided to or received from a customer termination 14, it then sends a positive indication 5 to that customer termination 14 through the web session 17.

The customer 13 checks for receipt of such positive determination 5 from the server through the web session (i.e. though their app or browser) to confirm that the incoming call 1, over which the code 4 was transmitted, has been received by the server 15 and thus that the call connection 16 originates from the organization claimed. The server 15 only provides a positive indication 5 if the server detects, on one of the organization's outgoing call paths 16, the code that was provided to or received from the customer.

According to an embodiment, a time delay between sharing the code 3 between the customer and the server and detecting the code 4 on one of the organization's outgoing call paths 16 is measured and the positive indication 5 is only provided to the customer if the delay is within a set limit. Where the server 15 does not detect a code that it has issued, or detects a code that it issued an excessive time ago, no positive indication is provided. According to an embodiment, if no valid code is received within a set time period, the server will respond to a request for validation with a negative indication, i.e. an indication that the calling party is not the organization. This allows codes to be re-used after a period of time longer than the set limit.

According to an embodiment, a code is allocated for each call 1 to a customer 13 from the organization 10, 11 over the organization's outgoing call paths 16. According to an embodiment, codes are created with a number of permutations adequate to distinguish between a number of concurrent calls, for example the number may equal the number of circuits on the outgoing call paths. For smaller organizations with low calling volume a four-digit code may be acceptable, while for larger calling volumes a longer codes may be required. According to an embodiment, to increase security, a code, once issued, is only valid for a short duration. If the server 15 receives the PIN in a message 4 over the first connection 16 before expiry of a timer, the response 5 is a confirmation. If the PIN is not received in that time, the response 5 indicates a validation failure. The failure message may include a message offering the user an opportunity to repeat the request (in case of user error) or to disconnect.

For example, a life of 20-30 seconds and a length of 5 to 7 digits creates a volume of combination sufficient to make reuse in any given few hours unlikely.

As the code 3 provided through the web session 17 and the code 4 received on the call path 16 must match, the system is secure. A fraudulent call to the user termination 12 (i.e. a call made by a person 20 falsely claiming to be made over the call path 16 associated with the server 15) would fail the validation as the code 3 provided to the customer 13 would be forwarded (step 4) by the customer 13 over the call path 26 over which the rogue call was made, and not on one of the organization's outgoing call paths 16, and thus would not be detected by the server 15, so no acknowledgement 5 would be transmitted.

As an additional precaution, the indication 5 provided by the server 15 may include an indication of the call path 16 on which the code 4 was returned to it, such as a Calling Line Identity. This provides a positive confirmation to the user 13 that the server 15 is indeed connected to the call path 16, and avoids the small but finite possibility that the same code has been transmitted to the server 15 from another user, on another call path, at around the same time (either because the other user made an error or because the codes are being re-used). According to a second embodiment, depicted schematically in FIG. 4, the following are modified:

iv) A code is selected by the customer or displayed by the second termination device 14, and entered over the first connection 16 (the live call) via DTMF digits (44).

v) The server 15 detects the DTMF digits entered by monitoring traffic on the organization's outgoing call paths.

vi) The server shares the detected DTMF digits 55 with the app or web page; and the app or browser running on the customer's device displays the detected DTMF digits, so that the customer 13 can check the displayed digits 55 returned over the second link 17 against the code 44 he entered in the call over the first link 16.

In this embodiment, the selection of the code is done by the customer 13.

Figure 5:
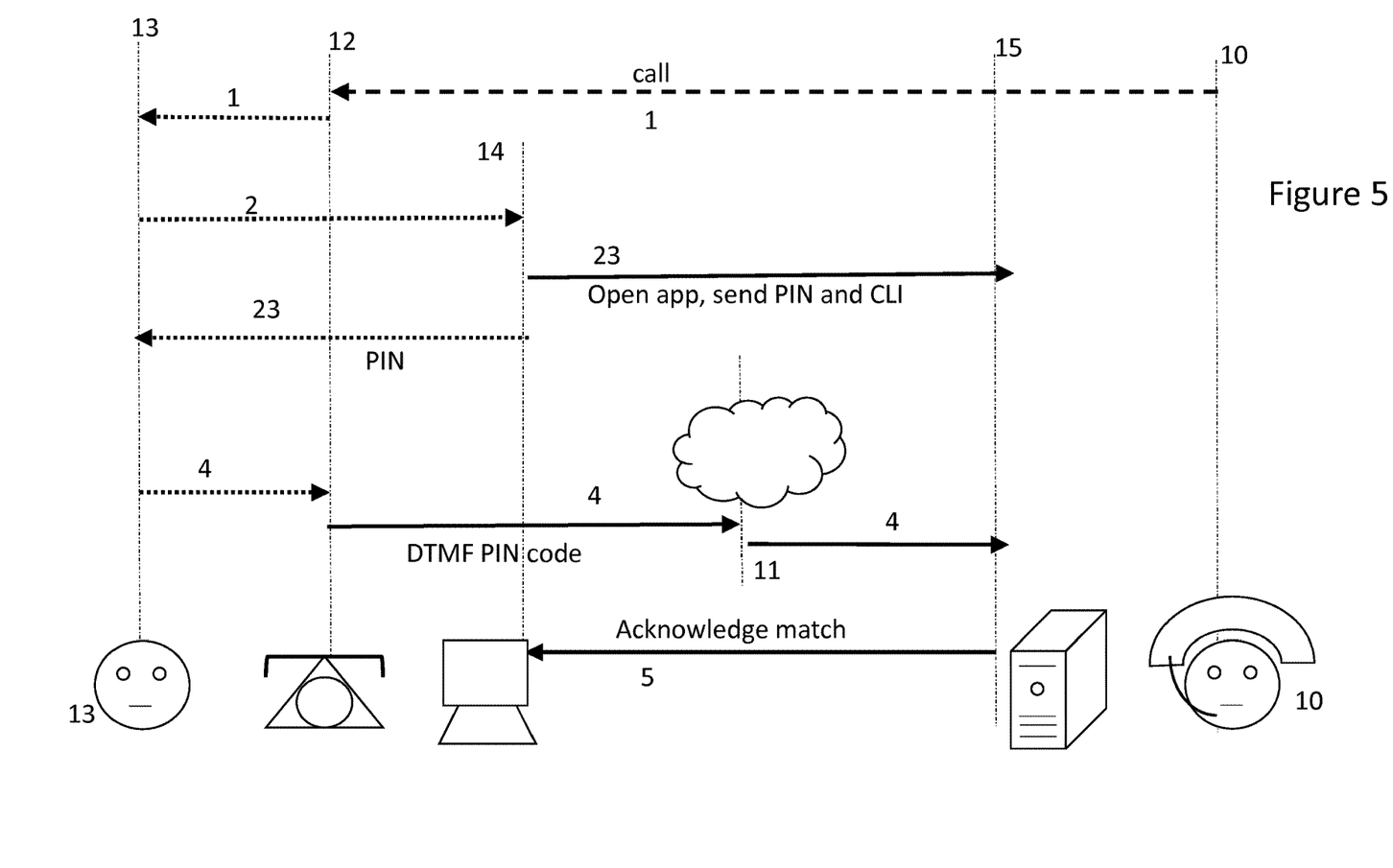

According to a third embodiment, depicted schematically in FIG. 5, the following is modified:

iv) When the app or web page is opened, it also provides a code 23 to the server 15 and also displays it to the customer. The server 15 can then compare the codes 23, 4 which it receives over the respect communications links 16, 17 and return an acknowledgement 5 if they match.

According to this embodiment, a code 23 is pre-set in the customer's device, or can be selected by the customer. A timer is set per customer, based on the appropriate time needed for the customer termination 14 and server 15 to exchange the code 3 through the web session and to enter the code 4 onto the call path 16. Although multiple codes may be valid concurrently for various ongoing calls, the server 15 keeps a log of which code is issued to, or received from, which customer (i.e. issued or received through which web session) and on detecting a valid, matching code entered on a call path, provides an indication that the call is valid through the appropriate customer's web session.

To avoid the consequences of spurious or duplicate incoming responses 4 being associated with the wrong network connection 17, the server 15 may add to the confirmation message 5 the calling line identity (CLI) of the first network connection 16 over which the code 4 was received. The user 13 will thus receive the CLI of the first network connection 16 in a massage 5 transmitted over the second network connection 17, confirming that the two connections 16, 17 have been correctly associated at the server 15.

Security may also be enhanced by adding a confirmation of the receiving voice path 16 to the initial request message 2 (23). This may be achieved by preprogramming an application on the user device 14 with the CLI of the connection 16 connected to the user's terminal 12, or it may be entered by the user when opening the application. Therefore when requesting a PIN via the app/web page (2) the user in the message also sends the CLI that the original call 1 was received on, i.e., the home landline number. The server 15 can then identify the voice path 16 in respect of which the PIN request 2 has been received, and can monitor that connected voice path 16 for the corresponding DTMF code 4 to be entered and returned. This makes it more secure as only a PIN 4 received on the connection 16 having the corresponding CLI would be validated.

The added CLI also allows an early indication to use caution, as the server can match the CLI supplied by the user in the message 2 to the currently-open calls at the network connection 11. The message 3 returned to the user by the server in response to opening the application 2 server 15 may then include a warning to the user that the business has not dialed the CLI reported in the message 2, indicating that it is not a genuine call.

Figure 6:
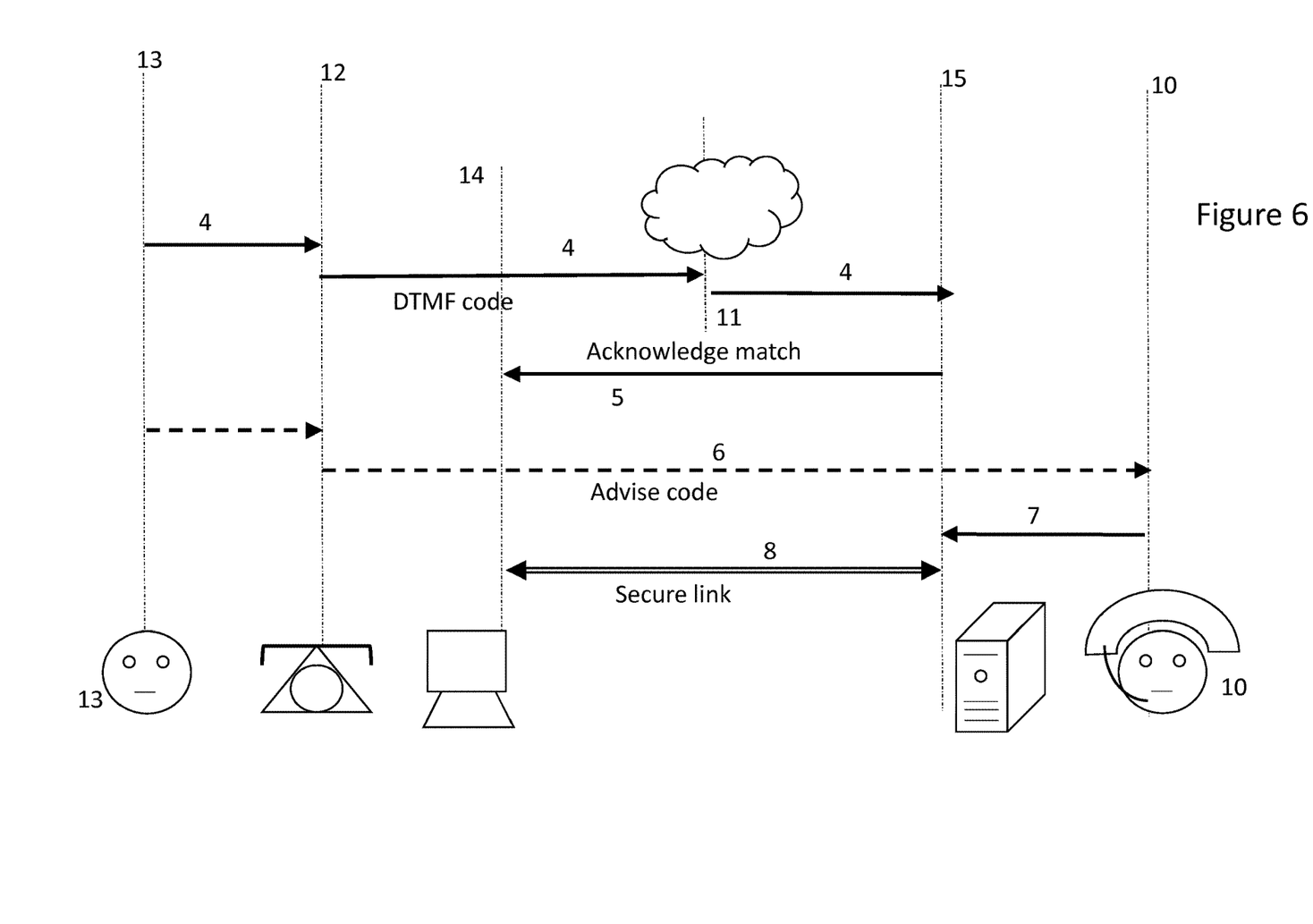

The match 5 allows the customer 13 to share a session ID with the agent to allow the sessions to find each other. This is then a validated customer/agent path but would still require authentication by the agent of who the end user really is. The customer is assured that it is the right business calling them, but at this point the agent still does not know the identity of the called party 13, only that the person they dialed on the connection 12 also has access to the terminal 14. In an additional feature, shown in FIG. 6, once the customer 13 is satisfied that the agent 10 is genuine, he may speak to the agent 10 over the first (voice) link 16 and tell the agent the code 4 (44) (6). The agent 10 can then enter the code himself (7) to the server 15. The server 15 compares the code 7 entered by the agent 10 with the code 4, (44)

originally provided to (or by) the customer over the path 17, to verify the customer's identity to the server, allowing a secure path to be set up over the second (data) link 17 between the customer terminal 14 and the server 15 (8).

The secure link 8 can be used for further ID checks (such as like a password, account number, National insurance number), to avoid the customer having to speak the information over the voice link 16 and risk being overheard. Once both the customer and the agent session are connected 8 over both the voice path 16 and IP path 17, and both are now validated, they can use the IP path 17 to push and pull data of a sensitive nature.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention.

The invention claimed is:

1. A method for authenticating a call from a call originator to a call recipient, in which the method comprises, at a server:
monitoring a first communications path assigned to a first party;
monitoring a call originated by the first party over the first communications path to detect a first code entered on the call by a call recipient;
comparing the first code detected in the call with a second code shared between the call recipient and the server on a second communications path independent of the first communications path; and
wherein, when the first code detected in the call matches the second code shared between the call recipient and the server, providing to the call recipient, over the second communications path, an indication that a call originator on the call is the first party.

2. The method of claim 1, wherein the second code is shared between the call recipient and the server by:
receiving at the server over the second communications path, a request communicated by a call recipient; and
in response to the request, providing the second code to the call recipient over the second communications path.

3. The method of claim 1, wherein the second code is shared between the call recipient and the server by:
receiving the second code at the server from the call recipient over the second communications path.

4. The method of claim 1, wherein the indication is only provided if detection of the first code in the call occurs within a set time period after sharing the second code between the call recipient and the server.

5. The method of claim 1, wherein the call recipient transmits over the second communications path a message identifying the first communications path, and the server only transmits the indication that the call originator on the call is the first party if the second code is received on the first communications path so identified.

6. The method of claim 1, wherein the indication provided to the call recipient over the second communications path includes an indication of an identity of the first communications path.

7. The method of claim 1, wherein the server is responsive to receiving a third code from the call originator corresponding to the shared second code to set up a secure connection over the second communications path.

8. A non-transitory computer-readable storage medium storing a computer program element comprising computer program code to, when loaded into a computer system and executed thereon, cause the computer system to perform the method as claimed in claim 1.

9. A server comprising:
a call monitor to monitor a first communications path assigned to a first party;
a code detector to monitor a call originated by the first party over the first communications path to detect a first code entered on the call by a call recipient;
a code management system for sharing a second code with the call recipient on a second communications path independent of the first communications path;
a code comparator to compare the first code detected in the call with the second code shared between the call recipient and the server;
a message generator to generate a message indicating that the call originator on the call is the first party if the first code detected in the call matches the second code shared between the call recipient and the server, and
a network interface for transmission of the generated message over the second communications path to the call recipient.

10. The server according to claim 9, wherein the code management system comprises a code generation system to provide the second code to a call recipient over the second communications path in response to a request received over the second communications path.

11. The server according to claim 9, wherein the code management system comprises a monitoring system configured to monitor the second communications path for the second code received from a call recipient over the second communications path.

12. The server according to claim 9, wherein the message generator is configured to provide the indication only if detection of the first code in the telephone call occurs within a set time period after sharing the second code between the call recipient and the server.

13. The server according to claim 9, wherein the message generator is configured to generate the message only if the second code is received on a first communications path identified in a message received from the called party over the second communications path.

14. The server according to claim 9, wherein the call monitor is configured to monitor the first connection for a line identity of the first communications path, and the message generator is configured to provide an indication of the line identity of the first communications path in the message to be transmitted over the second communications path.

15. The server according to claim 9, wherein:
- the call monitor is configured to receive a third code from a call originator;
- the code comparator is configured to compare the third code with the shared second code; and
- the server further comprises a secure connection management system responsive to the code comparator for establishing a secure connection over the second communications path.

\* \* \* \* \*